United States Patent [19]

Yoshida

[11] Patent Number: 4,792,964

[45] Date of Patent: Dec. 20, 1988

[54] ADAPTIVE JITTER CANCELLER HAVING SINUSOIDAL ACCENTUATOR AND JITTER PREDICTION FILTER

[75] Inventor: Atsushi Yoshida, Tokyo, Japan

[73] Assignee: NEC Corporation, Tokyo, Japan

[21] Appl. No.: 148,984

[22] Filed: Jan. 27, 1988

[30] Foreign Application Priority Data

Jan. 28, 1987 [JP] Japan ................................. 62-16119

[51] Int. Cl.⁴ ............................................ H04L 7/00
[52] U.S. Cl. .................................... 375/118; 375/12; 364/574
[58] Field of Search ...................... 375/11, 12, 99, 101, 375/102, 103, 104; 328/162, 163; 364/574; 455/296

[56] References Cited

U.S. PATENT DOCUMENTS

| | | | |
|---|---|---|---|
| 4,004,226 | 1/1977 | Qureshi et al. ........................ | 375/101 |
| 4,086,592 | 4/1978 | Lewis et al. .......................... | 375/99 |
| 4,412,341 | 10/1983 | Gersho et al. ....................... | 375/102 |
| 4,458,355 | 7/1984 | Motley et al. ........................ | 375/99 |
| 4,481,645 | 11/1984 | Karabinis ............................. | 375/99 |
| 4,541,101 | 9/1985 | Potage et al. ....................... | 375/102 |
| 4,627,080 | 12/1986 | Debus, Jr. ............................ | 375/101 |
| 4,639,939 | 1/1987 | Hirosaki et al. ..................... | 375/118 |
| 4,694,468 | 9/1987 | Cullum ................................ | 375/101 |

*Primary Examiner*—Robert L. Griffin
*Assistant Examiner*—Stephen Chin
*Attorney, Agent, or Firm*—Foley & Lardner, Schwartz, Jeffery, Schwaab, Mack, Blumenthal & Evans

[57] ABSTRACT

A signal representative of the carrier phase of a received digitally modulated signal is supplied to a first low-pass filter for band-limiting frequencies of the carrier phase signal below $1/(2NT)$, where N is an integer equal to or greater than two and T is a unit delay time. The band-limited signal is sampled at intervals NT and fed to a digital sinusoidal accentuator for accentuating the signal at intervals NT. An interpolator converts the output of accentuator to a series of samples spaced at intervals $1/T$ by inserting zero-bit samples between adjacent input samples. A second low-pass filter band-limits the frequencies of the output of the interpolator below $1/(2NT)$. A prediction filter receives the output of the second low-pass filter to produce a cancelling signal which is combined with the received signal to cancel the phase jitter.

4 Claims, 3 Drawing Sheets

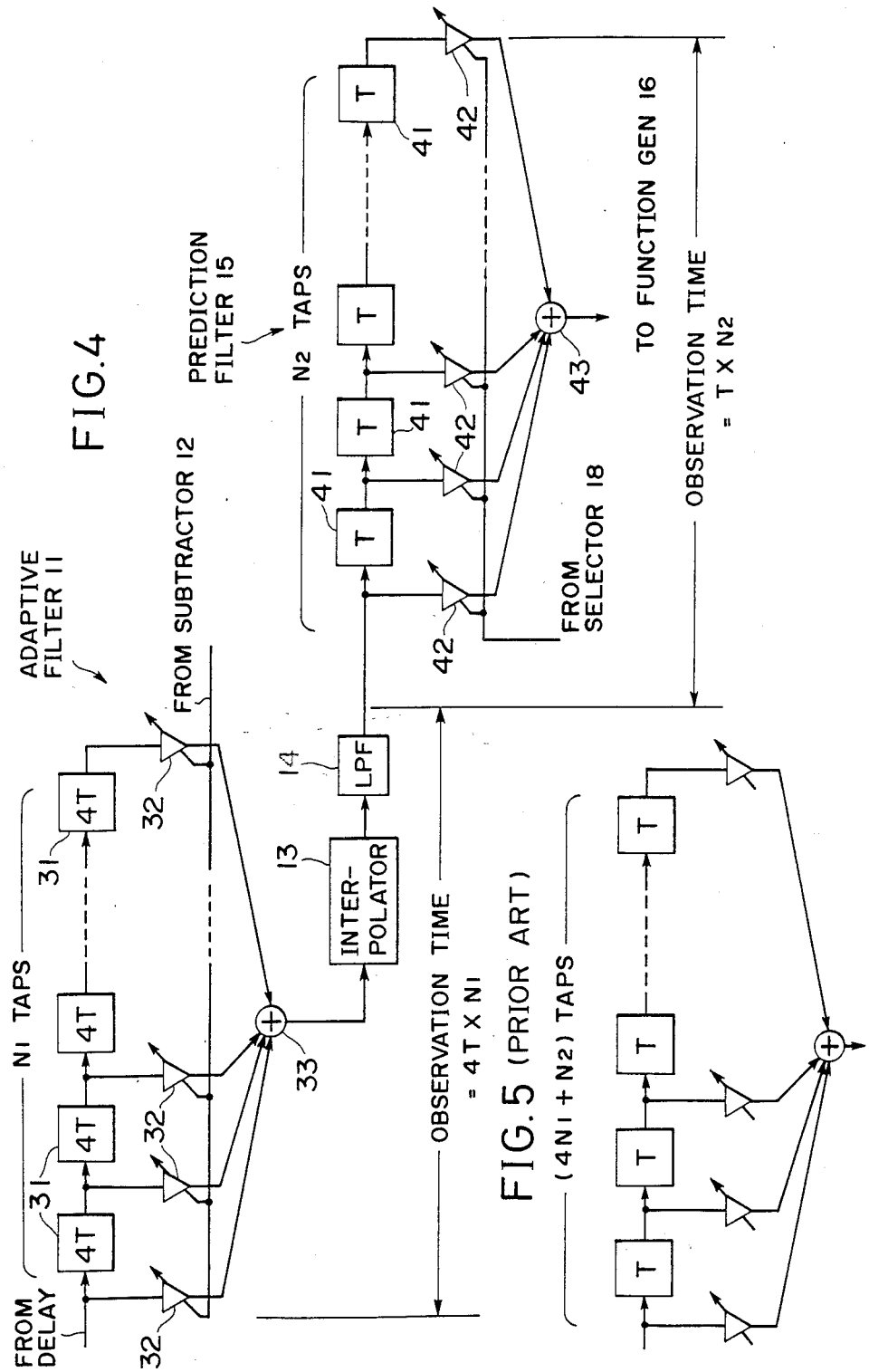

ADAPTIVE JITTER CANCELLER HAVING SINUSOIDAL ACCENTUATOR AND JITTER PREDICTION FILTER

BACKGROUND OF THE INVENTION

The present invention relates to an adaptive jitter canceller for cancelling phase jitter introduced into a transmission system.

In a prior art jitter canceller as shown and described in U.S. Pat. No. 4,639,939, issued to Hirosaki et al and assigned to the same assignee as the present invention, apparatus is described which extracts the carrier phase of a received QAM (quadrature amplitude modulation) signal and feeds it to a jitter prediction filter. The output of the prediction filter is used to compensate for the phase jitter. The jitter prediction filter is constructed of a finite impulse response (FIR) digital filter whose taps are adaptively controlled to affect the separation between noise components and phase jitter. However, a larger number of taps are required to ensure a high degree of accuracy. Typically, for a 128-QAM data modem with a baud rate of 2400 Hz, the number of taps would be in the range between 30 and 50. This requires a substantial amount of memory and calculation time.

SUMMARY OF THE INVENTION

It is therefore an object of the invention to provide an adaptive jitter canceller in which the amount of memory and calculation time can be held within a reasonable range while meeting the required level of accuracy in jitter prediction.

According to the present invention, a signal representative of the carrier phase of a received digitally modulated signal is detected and supplied to a first low-pass filter for band-limiting frequencies of the carrier phase signal below $1/(2TT)$, where N is an integer equal to or greater than two and T is a unit delay time. The band-limited signal is sampled at intervals NT and fed to a digital sinusoidal accentuator for sinusoidally accentuating the signal at intervals NT. An interpolator converts the output of accentuator to a series of samples spaced at intervals $1/T$ by inserting zero-bit samples between adjacent input samples. A second low-pass filter band-limits the frequencies of the output of the interpolator below $1/(2NT)$. A prediction filter receives the output of the second low-pass filter to produce a cancelling signal which is combined with the received signal to cancel the phase jitter.

In a QAM receiver having a 2400-Hz sampling frequency, the integer N is preferably 4 since the phase jitter in the transmission system occurs in a range between 20 and 300 Hz. The sinusoidal accentuator can be operated at intervals 4T, i.e., at sampling frequency 600 Hz. The operation of the accentuator at the reduced sampling frequency enables the accentuator to be implemented with delay line taps ¼ smaller than would otherwise be required.

BRIEF DESCRIPTION OF THE DRAWINGS

The present invention will be described in further detail with reference to the accompanying drawings, in which:

FIG. 4 is a block diagram illustrating the details of the adaptive filter and prediction filter of FIG. 1; and FIG. 5 is a block diagram of the adaptive filter of a prior art cancelling filter.

DETAILED DESCRIPTION

Figure 1:
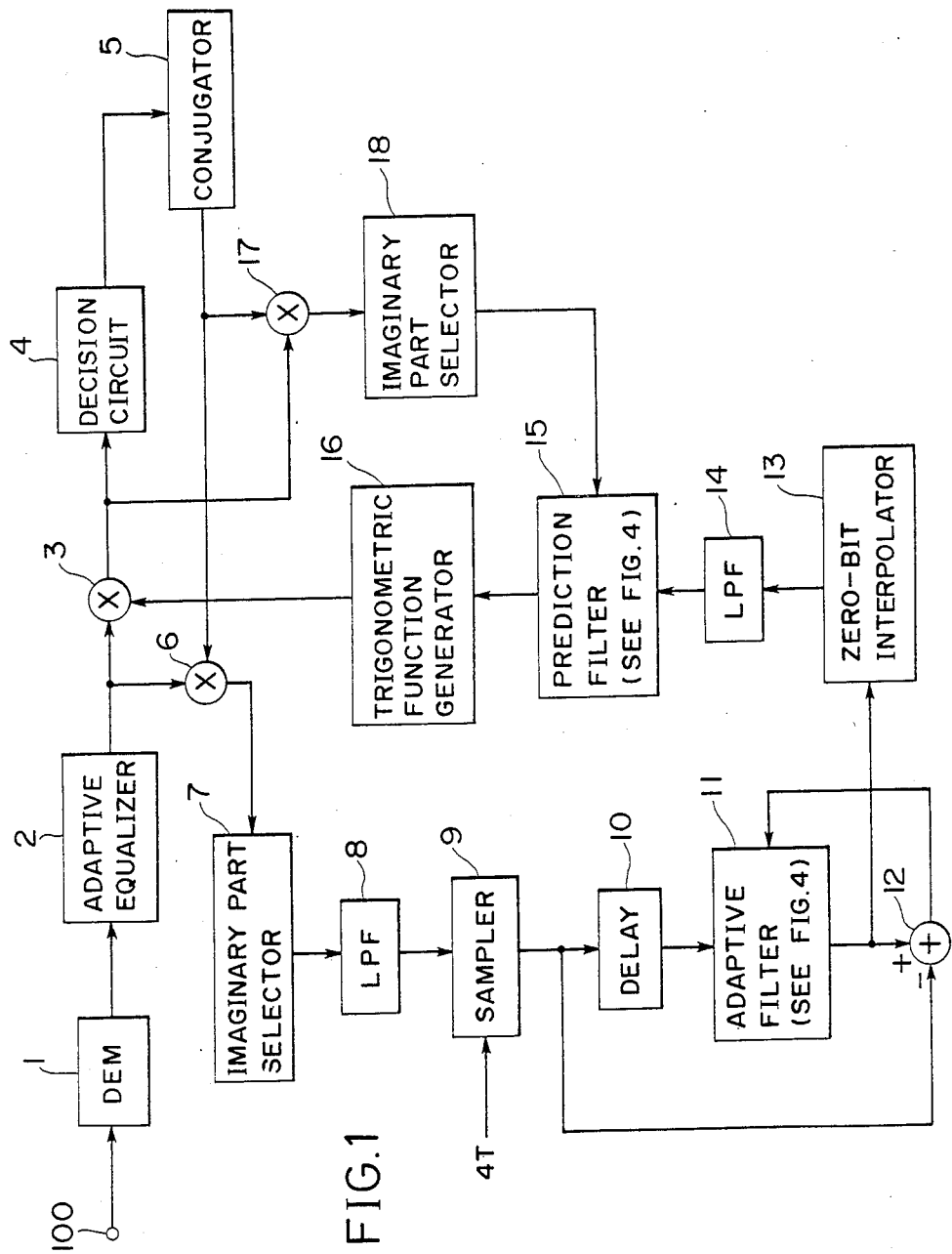
FIG. 1 is a block diagram of an embodiment of the present invention.
Figure 3:
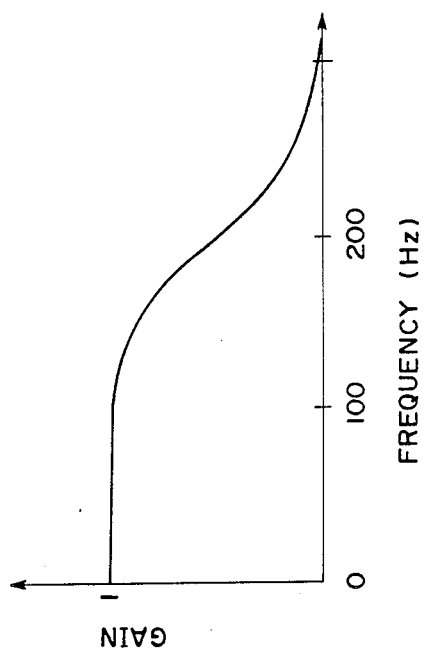
FIG. 3 is a graphic representation of the frequency response of the low-pass filters.
Figure 2:
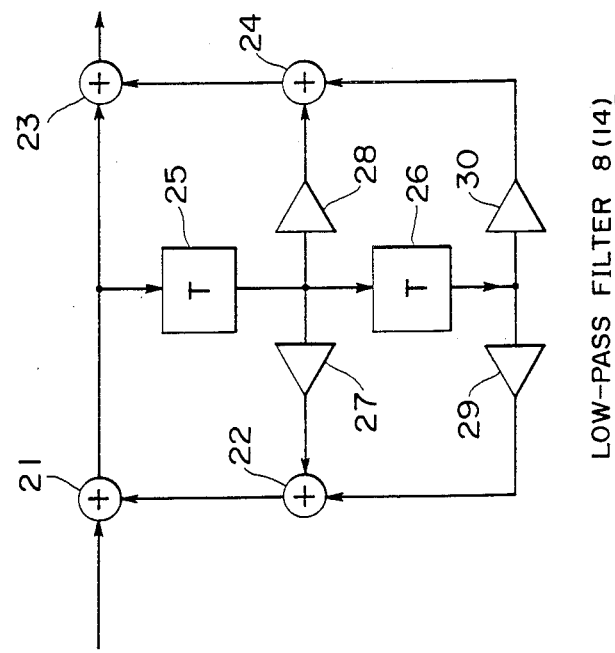
FIG. 2 is an illustration of details of the low-pass filters of FIG. 1.

Referring now to FIG. 1, there is shown an adaptive jitter canceller constructed according to a preferred embodiment of the invention. The jitter canceller of the invention is to be used in a 2400-baud rate data modem. A 128-QAM input signal, sampled at 2400 Hz, is applied to an input terminal 100 and supplied to a QAM demodulator 1 where it is demodulated and applied to an adaptive equalizer 2. The equalized signal is presented as a complex baseband signal to a first input of complex multipliers 3 and 6. The output of multiplier 3 is coupled to a decision circuit 4 which converts it to a signal having discrete amplitude levels by comparison with multiple decision thresholds. The output of decision circuit 4, which represents reference signal points in the phasor diagram and can be used as a reference carrier phase of the received signal for comparison with the output of multiplier 3, is supplied to a conjugator 5. The output of conjugator 5 is coupled to the second input of multiplier 6 to provide complex multiplication between the conjugate output and complex baseband signal. The imaginary part of the complex signal from multiplier 6 is separated from the real part by an imaginary part selector 7. The separated imaginary part represents the carrier phase of the received QAM signal. Since the phase jitter component of the 2400-Hz input signal lies in a range between 20 and 300 Hz, frequency components higher than 300 Hz are removed from the carrier phase signal by a digital low-pass filter 8 having a frequency response shown in FIG. 3, so that the carrier phase signal is badd-limited to frequencies below ⅛ of the received signal. As shown in FIG. 2, one example of such a digital low-pass filter is constructed of adders 21 through 24, delay elements 25 and 26 each introducing a delay of unit interval T ($=1/2400$ seconds), and multipliers 27 through 30 each having a calculated weighting function.

The output of low-pass filter 8 is sampled at intervals 4T ($=1/600$ seconds) by means of a sampler 9, the sampled output being applied to a digital adaptive sinusoidal accentuator formed by a delay circuit 10, adaptive filter 11 and a subtractor 12 to detect the phase jitter component. More specifically, the output of sampler 9 is passed through the delay circuit 10 to the adaptive filter 11 whose output is compared with the output of sampler 9 by the subtractor 12 to detect the difference. The output of subtractor 12 is supplied as a tap control signal to the adaptive filter 11.

As shown in FIG. 4, the adaptive filter 11 comprises a plurality of delay elements 31 connected in a tapped delay line. Each of the delay elements 31 introduces a unit delay time 4T with a maximum of $4T \times N_1$ delay time (where $N_1$ represents the number of taps or delay elements 31). Variable multipliers 32 are connected to the tapped delay line. Multipliers 32 are controlled by a signal supplied from the subtractor 12 such that the average power of the output of subtractor 12 is reduced to a minimum. The outputs of multipliers 32 are summed in an adder 33 to generate an output which represents the phase jitter.

The output of adaptive filter 11 is supplied to a zero-bit interpolator 13 which inserts three zero-bit samples between adjacent input samples and generates a series of samples at intervals T. The waveform of the output of the zero-bit interpolator 13 is shaped by a digital low-pass filter 14 of the same construction and frequency response as those of low-pass filter 8 by band-limiting its input to frequencies below 300 Hz. The output of low-pass filter 14 is a series of phase-jitter representative samples which occur at intervals T, which is fed to a jitter prediction filter 15 to provide further noise elimination and phase adjustment for application to a trigonometric function generator 16, which converts it to complex vectors for coupling to the second input of multiplier 3 to cancel the phase jitter component of the output of equalizer 2.

As shown in FIG. 4, the prediction filter 15 is constructed of delay elements 41 each having a delay time T connected in a tapped delay line, variable multipliers 42 connected to the tapped delay line, and an adder 43 for summing the outputs of multipliers 42. This tapped delay line has a maximum delay time of $T \times N_2$, where $N_2$ represents the number of taps or delay elements 41. Multipliers 42 are controlled by a signal supplied from an imaginary part selector 18.

A multiplier 17 is provided having a first input coupled to the output of conjugator 5 and a second input coupled to the output of multiplier 3 to detect the phase difference between the output of multiplier 3 and the reference carrier phase obtained by threshold decision circuit 4. The phase difference signal from multiplier 17 is supplied to the imaginary part selector 18 to derive a control signal for application to the jitter prediction filter 15 to control its variable multipliers 42 so that the detected phase error reduces to a minimum.

The performance of a jitter canceller depends on the power of resolution with which it detects the phase jitter and noise component and which resolution depends on the amount of time during which the carrier phase is observed. By normalizing the unit delay time T as 1, the jitter canceller of the present invention has the following parameters:

$t = 4N_1 + N_2$ $M = 2(N_1 + N_2)$ $L = N_1/4 + N_2$ where, t is the total observation time, M represents the total amount of a random access memory by which the delay elements and multipliers are implemented, and L is the number of multiplications performed on each sample.

FIG. 5 shows an essential part of the prior art jitter canceller in which only one adaptive filter is provided. If the adaptive filter of the prior art has a unit delay time T, as many as $(4N_1 + N_2)$ taps or delay elements would be required with the prior art jitter canceller if observation is effected during the same length of time as in the present invention. Thus, the prior art jitter canceller has the following parameters:
ti $M = 2(4N_1 + N_2) = 8N_1 + 2N_2$ $L = 4N_1 + N_2$.

It is seen therefore that the present invention is advantageous over the prior art in terms of memory capacity and the number of multiplications.

While mention has been made of the adaptive filter 11 having a total delay time $4T \times N_1$, it is to be noted that the minimum value of the delay time is $2T \times N_1$.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An adaptive jitter canceller comprising:
    means for detecting a signal representative of the carrier phase of a received digitally modulated signal;
    first low-pass filter means for band-limiting said carrier phase signal to frequencies below $1/(2NT)$, where N is an integer equal to or greater than two and T is a unit delay time;
    sampling means for sampling an output signal from said first low-pass filter means at intervals NT;
    digital sinusoidal accentuator means for accentuating an output signal from said sampling means at intervals NT;
    interpolator means for interpolating an output signal from said sinusoidal accentuator means and generating a series of smmples spaced at intervals $1/T$;
    second low-pass filter means for band-limiting an output signal from said interpolator means to frequencies below $1/(2NT)$;
    prediction filter means for receiving an output signal from said second low-pass filter means; and
    means for cancelling phase jitter contained in said received signal with an output signal from said prediction filter means.

2. An adaptive jitter canceller as claimed in claim 1, wherein said digital sinusoidal accentuator means comprises:
    delay means connected to an output of said sampling maans;
    adaptive filter means having a tapped delay line connected to said delay means, the tapped delay line ccomprising a series of delay elements each having a delay time NT, a plurality of variable multipliers each having a variable weighting function connected to said tapped delay line, and an adder for combining outputs of said multipliers; and
    means for detecting a difference between tee output signal from said sampling means and an output signal from said adder and supplying the detected difference to said multipliers to control the variable weighting functions of the multipliers, the output signal from said adder being supplied to said interpolator means.

3. An adaptive jetter canceller as claimed in claim 2, wherein said prediction filter means comprises:
    a second tapped delay line connected to an output of said second low-pass filter means, the second tapped delay line comprising a series of delay elements each having a delay time T;
    a plurality of second variable multipliers connected to said second tapped delay line, said second variable multipliers each having a variable weighting function; and a second adder for summing output signals from said second multiplier and supplying an output signal to said means for cancelling phase jitter, further comprising:
means for detecting a reference carrier phase of said received digitally modulated signal; and
means for detecting a phase difference between an output signal from said means for cancelling phase jitter and said reference carrier phase and controlling said variable weighting functions of said second variable multipliers with the detected phase difference.

4. An adaptive jitter canceller as claimed in claim 3, wherein said reference carrier detecting means comprises decision means for converting the output signal of said means for cancelling phase jitter to a multilevel signal having discrete amplitude levels by comparison with multiple decision thresholds, and wherein said phase difference detecting means comprises:
conjugator means for processing said multilevel signal;
multiplier means for multiplying an output signal from said conjugator means with said output signal of said means for cancelling phase jitter; and
means for detecting an imaginary part of an output signal from said multiplier means and controlling said variable weighting functions of said second variable multipliers with the detected imaginary part.

* * * * *